United States Patent
Lee et al.

(10) Patent No.: US 10,836,377 B2
(45) Date of Patent: Nov. 17, 2020

(54) VEHICLE CONTROL SYSTEM AND CONTROLLING METHOD THEREOF

(71) Applicants: Hyundai Motor Company, Seoul (KR); Kia Motors Corporation, Seoul (KR)

(72) Inventors: Min Su Lee, Seoul (KR); Woo Kyun Kim, Seoul (KR); Huikwon Lee, Gyeonggi-Do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 195 days.

(21) Appl. No.: 16/055,101

(22) Filed: Aug. 5, 2018

(65) Prior Publication Data

US 2019/0308611 A1    Oct. 10, 2019

(30) Foreign Application Priority Data

Apr. 6, 2018 (KR) .......................... 10-2018-0040100

(51) Int. Cl.
| | |
|---|---|
| *B60W 30/04* | (2006.01) |
| *B60T 8/1755* | (2006.01) |
| *B60W 40/105* | (2012.01) |
| *B60W 40/114* | (2012.01) |
| *B60W 40/101* | (2012.01) |
| *B60W 40/109* | (2012.01) |
| *B60W 40/068* | (2012.01) |

(52) U.S. Cl.
CPC ......... *B60W 30/04* (2013.01); *B60T 8/17551* (2013.01); *B60T 8/17552* (2013.01); *B60T 8/17554* (2013.01); *B60W 40/068* (2013.01); *B60W 40/101* (2013.01); *B60W 40/105* (2013.01); *B60W 40/109* (2013.01); *B60W 40/114* (2013.01); *B60W 2552/40* (2020.02); *B60W 2710/223* (2013.01)

(58) Field of Classification Search
CPC ................ B60W 30/04; B60T 8/17551; B60T 8/17552; B60T 8/17554
See application file for complete search history.

(56) References Cited

U.S. PATENT DOCUMENTS

| | | | | |
|---|---|---|---|---|
| 5,124,921 | A * | 6/1992 | Jonner | B60T 8/17551 303/146 |
| 9,950,703 | B2 * | 4/2018 | Lee | B60W 30/18172 |
| 2008/0140264 | A1 | 6/2008 | O'Dea et al. | |
| 2008/0234912 | A1 | 9/2008 | Choi | |

FOREIGN PATENT DOCUMENTS

| | | |
|---|---|---|
| JP | 2014-237386 A | 12/2014 |
| KR | 10-1296085 | 6/2011 |
| KR | 10-1350303 | 11/2013 |
| KR | 10-2014-0133319 | 11/2014 |

* cited by examiner

*Primary Examiner* — Faye M Fleming
(74) *Attorney, Agent, or Firm* — Mintz Levin Cohn Ferris Glovsky and Popeo, P.C.; Peter F. Corless

(57) ABSTRACT

Disclosed herein are a vehicle control system and controlling method thereof. The vehicle control system includes a plurality of sensors configured to measure a wheel speed, a steering angle, a yaw rate, and acceleration value, and a controller estimating the state of a vehicle based on the wheel speed, the steering angle, the yaw rate, and the acceleration value and updating a front and rear wheel stiffness of the vehicle when it is determined that the vehicle is running on an asymmetric friction surface from the estimated state of the vehicle.

14 Claims, 9 Drawing Sheets

VEHICLE CONTROL SYSTEM AND CONTROLLING METHOD THEREOF

CROSS-REFERENCE TO RELATED APPLICATION(S)

This application claims under 35 U.S.C. § 119(a) the benefit of Korean Patent Application No. 10-2018-0040100, filed on Apr. 6, 2018 in the Korean Intellectual Property Office, the entire contents of which are incorporated herein by reference.

BACKGROUND

1. Technical Field

The present disclosure relates to a vehicle control system and a controlling method thereof, and more particularly, to a vehicle control system and controlling method configured to stabilize a vehicle posture (i.e., prevent roll movements) when the vehicle turns on an asymmetric friction road surface.

2. Description of the Related Art

Generally, a vehicle is powered by one or more power sources such as fossil fuels, electricity, or the like. The vehicle is equipped with a variety of electronic components to protect a driver and provide the driver with convenience. For example, vehicles are equipped with electronic components that consume large amounts of power, such as a driving assistance system and heated seats, among other features.

For example, a vehicle may be equipped with a driving assistance system for ensuring the convenience and safety of a driver. In operation, the driving assistance system recognizes a pedestrian ahead through the use of a camera and a radar, and measures the distance to the pedestrian and the relative speed. Further, a braking device may be operated to determine the risk of collision and avoid collision.

In addition, various electronic control systems are installed in the vehicle to improve the stability of the vehicle and to secure braking stability. The electronic control system of the vehicle is provided with an anti-lock brake system (hereinafter abbreviated as 'ABS') that controls the speed of wheels during braking to prevent slippage of the wheels, an Electronic Stability Control (ESC), and an Active Roll Stabilizer (ARS) for improving the running stability of the vehicle.

Particularly, the ARS changes the height of a stabilizer mounted on the vehicle to cause twisting in a direction in which rolling can be suppressed during turning of the vehicle, distributing the roll moment to the front or rear wheels appropriately contributing to the improvement in turning stability.

However, in such a vehicle electronic control system, the ARS may have difficulty in judging an asymmetric friction road surface, and thus the behavior of the vehicle may become unstable due to a change of a road surface friction coefficient during turning.

SUMMARY

Therefore, it is an aspect of the present disclosure to stabilize the posture (i.e., prevent roll movements) of a vehicle by increasing the accuracy of an asymmetric friction road surface judgment.

Additional aspects of the present disclosure are to minimize the sense of heterogeneity due to ESC entry by slowing down an ESC intervention time of the vehicle during ARS operation.

However, in a vehicle electronic control system, the ARS has difficulty in judging the asymmetric friction road surface, thus the behavior of the vehicle becomes unstable due to a change of road surface friction coefficient during turning.

In accordance with an aspect of the present disclosure, a vehicle control system comprising: a plurality of sensors configured to measure a wheel speed, a steering angle, a yaw rate, and an acceleration value; and a controller estimating the state of a vehicle based on the wheel speed, the steering angle, the yaw rate, and the acceleration value and updating a front and rear wheel stiffness of the vehicle when it is determined that the vehicle is running on an asymmetric friction surface from the estimated state of the vehicle.

Here, the controller may be configured to determine that the vehicle is turning when the wheel speed is larger than a threshold value, and at least one of the steering angle, the yaw rate, and the acceleration value is larger than a corresponding threshold value of the steering angle, the yaw rate, or the acceleration value.

Here, the controller may be configured to estimate a vehicle speed from the wheel speed of each wheel, and calculate a longitudinal slip amount of each of the wheels based on the estimated vehicle speed when it is determined that the vehicle is turning.

Here, the controller may be configured to further calculate a driving force and a vertical force of each of the wheels, and calculates a friction coefficient of each wheel based on the driving force, the vertical force, and the longitudinal slip amount of each of the wheels.

Here, the controller may be configured to determine as the vehicle is on a high friction road surface when the calculated friction coefficient of each wheel is larger than the critical friction coefficient individually determined for each of the wheels, and determine as the vehicle is on an asymmetric frictional road based on the judgment result of a high friction road surface of the left front wheel and the left rear wheel of the vehicle and a judgment result of the high friction road surface of the right front wheel and the right rear wheel.

Here, the controller may be configured to update a roll moment of the vehicle and the roll moment front-rear wheel distribution ratio and calculate the front and rear wheel roll stiffness based on the updated roll moment and the roll moment front-rear wheel distribution ratio when the vehicle is judged to be on an asymmetric frictional road surface.

Here, the controller is configured to reduce the roll moment and the roll moment front-rear wheel distribution ratio when updating the roll moment and the roll moment front-rear wheel distribution ratio.

Further, when updating the roll moment and the roll moment front-rear wheel distribution ratio, the controller may be configured to once again (i.e., further) reduce the roll moment and the roll moment front-rear wheel distribution ratio as the vehicle speed of the vehicle increases.

In accordance with an aspect of the present disclosure, a controlling method of a vehicle control system, comprising: measuring a wheel speed, a steering angle, a yaw rate, and an acceleration value of a vehicle; estimating a state of the vehicle based on the measured wheel speed, steering angle, yaw rate, and acceleration value; and updating the front wheel and rear wheel roll stiffness of the vehicle when it is determined the vehicle is running on an asymmetric friction road surface from an estimated state of the vehicle.

Here, estimating the state of the vehicle may further comprise determining the vehicle is turning when the measured wheel speed is larger than a threshold value, and at least one of the measured steering angle, yaw rate, and lateral acceleration is larger than a threshold value.

Here, determining the vehicle is turning may further comprise estimating the vehicle speed from the wheel speed of each wheel, and calculating a longitudinal slip amount of each of the wheels based on the estimated vehicle speed when it is determined that the vehicle is turning.

Further, the controlling method may further comprise calculating a driving force and a vertical force of each of the wheels; and calculating a friction coefficient of each wheel based on the driving force, the vertical force, and the longitudinal slip amount of each of the wheels.

Here, determining the vehicle is running on the asymmetric friction road surface may further comprise determining as a high friction road surface when the calculated friction coefficient of each wheel is larger than the critical friction coefficient individually determined for each of the wheels, and determining as an asymmetric frictional road based on the judgment result of a high friction road surface of the left front wheel and the left rear wheel of the vehicle and a judgment result of the high friction road surface of the right front wheel and the right rear wheel.

Here, updating the front wheel and rear wheel roll stiffness of the vehicle may further comprise updating a roll moment of the vehicle and the roll moment front-rear wheel distribution ratio and calculating the front and rear wheel roll stiffness based on the updated roll moment and the roll moment front-rear wheel distribution ratio when the vehicle is judged to be on an asymmetric frictional road surface.

Here, updating the front wheel and rear wheel roll stiffness of the vehicle may further comprise reducing the roll moment and the roll moment front-rear wheel distribution ratio when updating the roll moment and the roll moment front-rear wheel distribution ratio.

Here, updating the front wheel and rear wheel roll stiffness of the vehicle may further comprise further reducing the roll moment and the roll moment front-rear wheel distribution ratio as the vehicle speed of the vehicle increases when updating the roll moment and the roll moment front-rear wheel distribution ratio.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the present disclosure will be described in detail with reference to the accompanying drawings.

Figure 1:
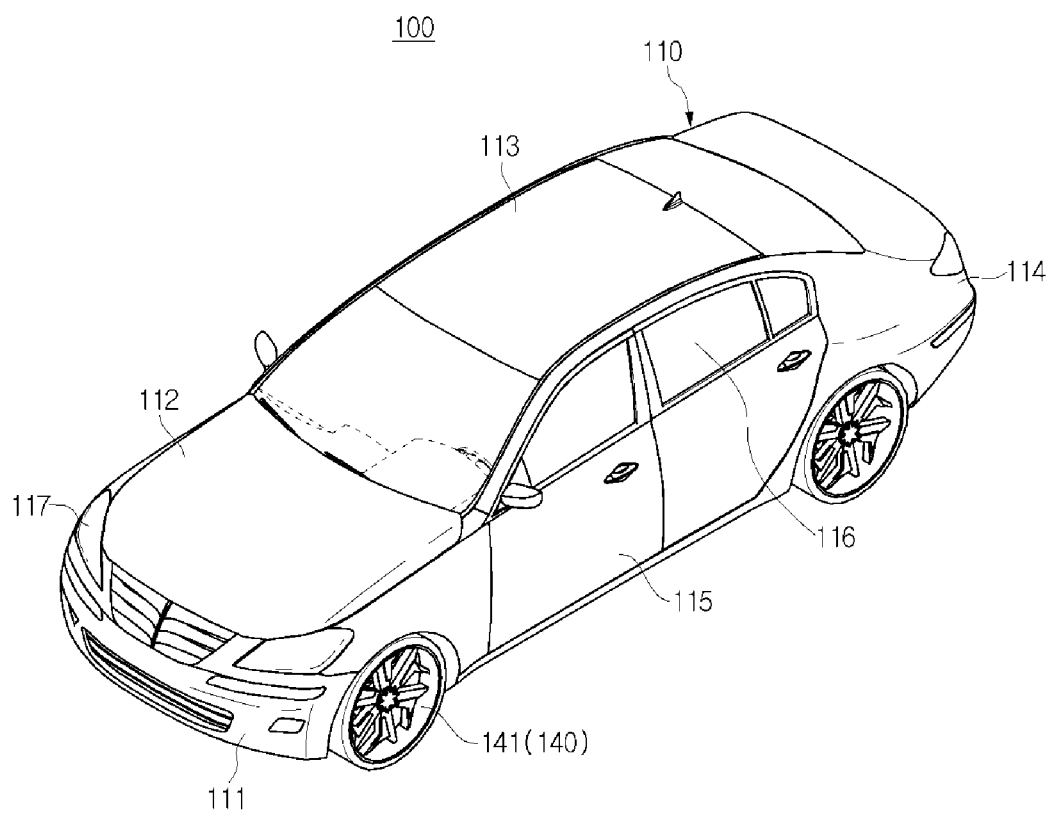
FIG. 1 is a view illustrating an appearance of a vehicle according to an embodiment of the present disclosure.
Figure 2:
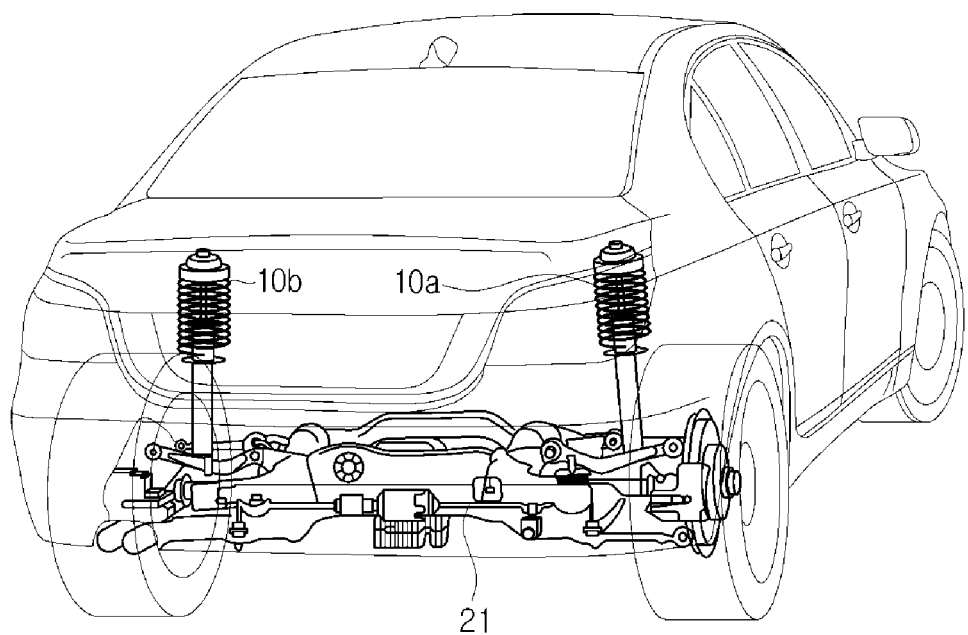
FIG. 2 is a view illustrating a stabilizer built in a vehicle body according to an embodiment of the present disclosure.
Figure 3:
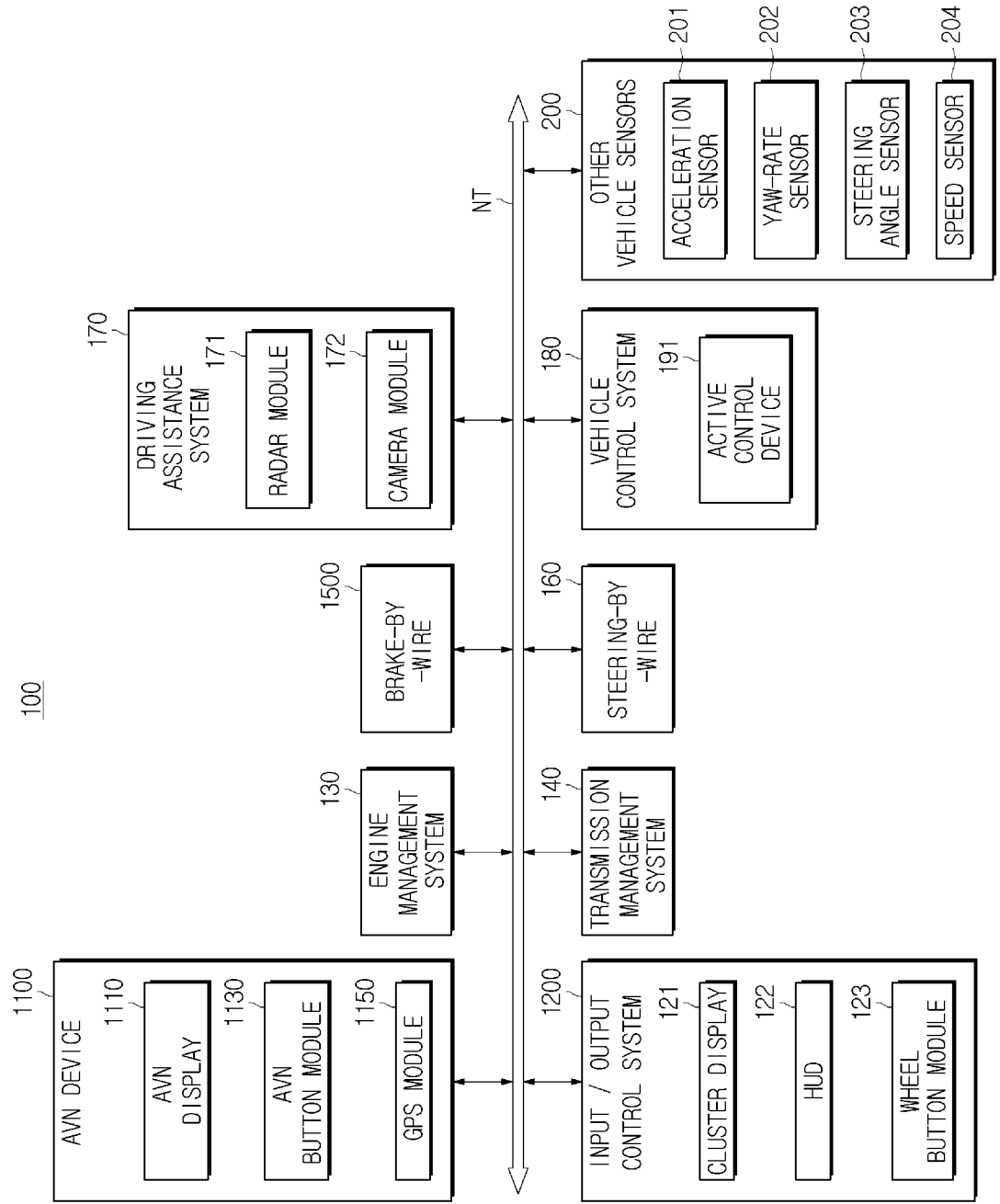
FIG. 3 is a block diagram illustrating various kinds of electronic devices of the vehicle according to an embodiment of the present disclosure.

FIG. 1 is a view illustrating an appearance of a vehicle according to an embodiment, FIG. 2 is a view illustrating a stabilizer built in a vehicle body according to an embodiment, and FIG. 3 is a block diagram illustrating various kinds of electronic devices of the vehicle according to an embodiment.

As shown in FIG. 1, a vehicle 100 according to an embodiment may be a hybrid vehicle that includes an engine, a battery, and a motor, and controls the mechanical power of the engine and the electric power of the motor to drive.

The vehicle 100 may include a body having an interior 120 and an exterior 110, and a chassis, which is the internal framework of the vehicle, and on which a mechanical apparatus for driving is installed.

As illustrated in FIG. 1, the exterior 110 of the body may include a front panel 111, a bonnet 112, a roof panel 113, a rear panel 114, a trunk 115, a front, rear, left, and right door 116, and a window glass 117 provided in the front, rear, left, and right door 116 to be openable.

The exterior of the vehicle body includes a filler provided at the boundary between the window glasses of the front and rear doors, a door mirror for providing a driver with a view of the rear of the vehicle 100, and a lamp 117 which performs a function of a signal and communication to the vehicle and a pedestrian.

As shown in FIG. 2, an ARS system may be included in the vehicle to perform roll control at the time of cornering of the vehicle. The ARS system can control the stiffness of springs 10a and 10b mounted on each wheel by adjusting the amount of oil pressure of a stabilizer bar 21 shown in FIG. 2.

That is, the ARS system adjusts the stiffness of the springs mounted on each wheel minimizing the roll angle during cornering of the vehicle, thereby stabilizing the posture of the vehicle. In this case, the roll angle refers to an angle at which the vehicle body tilts when the vehicle turns on a corner. Therefore, when the ARS system is mounted, the stiffness of the stabilizer bar 21 is reduced at the time of normal running, and the stiffness of the stabilizer bar 21 is increased at the time of occurrence of a roll, thereby reducing the roll.

Such a vehicle may internally include various kinds of electronic devices, as shown in FIG. 3.

For example, the vehicle 1 may include an audio/video/navigation (AVN) device 1100, an input/output control system 1200, an engine management system (EMS) 130, a transmission management system (TMS) 140, a brake-by-wire 1500, a steering-by-wire 160, a driving assistance system 170, a vehicle control system 180, other vehicle sensors 200, and the like.

The vehicle communication network NT may employ a communication protocol such as Media Oriented Systems Transport (MOST) with communication speeds of up to 24.5 mega-bits per second (Mbps), FlexRay with communication speeds of up to 10 Mbps, Controller Area Network (CAN) with communication speeds of 125 kilo-bits per second (Kbps) to 1 Mbps, Local Interconnect Network (LIN) with communication speeds of 20 Kbps, and the like. The vehicle communication network NT may employ not only a single communication protocol such as the MOST, the FlexRay, the CAN, and the LIN but also a plurality of communication protocols.

The AVN device 110 is a device that outputs music or video according to the driver's control command. In detail, according to the driver's control command, the AVN device 110 may play music or video or guide a route to a destination received from a navigation system (not shown).

The AVN device 110 includes an AVN display 1110 for displaying an image to the driver, an AVN button module 1130 for receiving a control command of the driver, and a GPS (Global Positioning System) module 1150 for acquiring geographical position information of the vehicle 1. Here the AVN display 111 may employ a touch sensing display (e.g., a touch screen) capable of receiving a touch input of the driver. Also, the AVN display 111 may employ a liquid crystal display (LCD) panel, an organic light emitting diode (OLED) panel, or the like.

The GPS module 115 also receives information for calculating the position of the vehicle 1 from GPS (Global Positioning System) satellites and can determine the position of the vehicle 1 based on the information received from the GPS satellites.

The input/output control system 120 receives the driver's control command through a button and displays information corresponding to the driver's control command. The input/output control system 120 may include a cluster display 121 provided in a dashboard and configured to display an image, a head up display (HUD) 122 configured to project an image onto a windshield, and a wheel button module 123 installed on a steering wheel.

The cluster display 121 is provided in a dashboard and configured to display an image. In particular, the cluster display 121 is provided adjacent to the windshield to enable the driver to acquire operational information, road information, a driving route, or the like while the gaze of the driver is not significantly deviated from a forward direction of the vehicle 1. The cluster display 121 may employ a liquid crystal display (LCD) panel or an organic light emitting diode (OLED) panel.

A HUD 192 may project an image onto the windshield. In detail, the image projected onto the windshield by the HUD 192 may include operational information of the vehicle 1, road information, a driving route, or the like.

Therefore, the operation state of the vehicle control system 180 can be shown through the input/output control system 120 so that the driver can confirm the operation state of the vehicle.

The engine management system 130 performs fuel injection control, fuel efficiency feedback control, lean-burn control, ignition time control, idle revolutions per minute (rpm) control, and the like. The engine management system 130 may be a single device, or may be a plurality of devices connected through communication.

The transmission management system 140 may perform a transmission control, a damper clutch control, a pressure control when a friction clutch is turned on/off and an engine torque control during shifting. The transmission management system 140 may be a single device or may be a plurality of devices connected through communication.

The brake control device 1500 may control the braking of the vehicle 1, and a representative example of the brake control device 150 may include the anti-lock brake system (ABS). The steering control device assists the steering operation by reducing the steering force during low-speed driving or parking, and increasing the steering force during high-speed driving.

The driving assistance system 170 assists the driving operation of the vehicle 1, and performs a forward collision avoiding function, a lane departure warning function, a dead zone monitoring function, a rearward monitoring function, and the like.

The driving assistance system 170 may include a plurality of devices connected through communication. For example, the driving assistance system 170 may include a Forward Collision Warning System (FCW) which detects a vehicle traveling in the same direction in front of the vehicle in the driving lane to avoid a collision with the preceding vehicle, an Automatic Emergency Braking System (AEBS) which mitigates impact when collision with the preceding vehicle is inevitable, Adaptive Cruise Control (ACC) which detects vehicles travelling in the same direction in front of the vehicle in the driving lane and automatically accelerates/decelerates according to the speed of the preceding vehicle, a Lane Departure Warning System (LDWS) which prevents departure from the driving lane, a Lane Keeping Assist System (LKAS) which controls the vehicle to return to the current lane when it is determined that the vehicle departs from the lane, Blind Spot Detection (BSD) which provides the driver with information about vehicles located in blind spots, and a Rear-end Collision Warning System (RCW) which detects a vehicle travelling in the same direction behind the vehicle in the driving lane to avoid a collision with the following vehicle.

The driving assistance system 170 may include a radar module 171 for detecting the positions of the preceding and following vehicles, and a camera module 172 for acquiring images of the preceding and following vehicles. Particularly, the radar module 171 may be used in a device operating according to the position of the front and rear vehicle, such as the Forward Collision Warning System (FCW), the Advanced Emergency Braking System (AEBS), Adaptive Cruise Control (ACC), Blind Spot Detection (BSD) and the Rear-end Collision Warning System (RCW). Also, the camera module 172 may be used in a device operating according to the preceding and following vehicles and an image of a road, such as the Lane Departure Warning System (LDWS) and the Lane Keeping Assist System (LKAS).

Next, the vehicle control system 180 according to an embodiment includes an active control device 191. As described above, the active control device 191 is a device for stabilizing the vehicle posture (i.e., minimizing roll movements of the vehicle) by controlling the roll angle when the vehicle is cornering by using the stabilizer and performing the roll angle control. However, the vehicle control system 180 may further include a traction control system other than the active control device 191, a stability control system, and the like.

The Traction Control System (TCS) controls the engine and the brake in order to prevent excessive slippage of the wheels at the time of sudden acceleration or rapid acceleration of the vehicle, transmits the control signal to the braking control device 150 included in the various electronic devices 1000 of the vehicle under the control of the brakes, and transmits the control signal to the engine management system 130 included in the various electronic devices 1 of the vehicle under control through the engine.

In addition, the vehicle control system 180 includes an electronic stability control (ESC). The Electronic Stability Control System controls the movement of the vehicle by controlling the engine power and the braking force transmitted to each wheel so that the vehicle moves as the driver intends during rapid turning or rapid braking of the vehicle.

Next, the other vehicle sensors 200 are included in the vehicle 1 and configured to detect the driving information of the vehicle 1, and may include an acceleration sensor 201, a yaw-rate sensor 202, a steering angle sensor 203, a speed sensor 204, and the like.

The acceleration sensor 201 measures the acceleration of the vehicle and may include a lateral acceleration sensor (not shown) and an acceleration sensor 201 (not shown). The yaw-rate sensor 202 can be installed on each wheel of the vehicle and can detect the yaw rate value in real time. The steering angle sensor 203 measures the steering angle. The steering angle sensor 203 is mounted on the lower end of a steering wheel 60, and can detect the steering speed, the steering direction, and the steering angle of the steering wheel. The speed sensor 204 can be installed inside the wheel of the vehicle to detect the rotational speed of the vehicle wheel.

The elements of the vehicle 1 have been described above. Elements and operations of the vehicle control system 180 included in the vehicle 1 will be described below.

Figure 4:
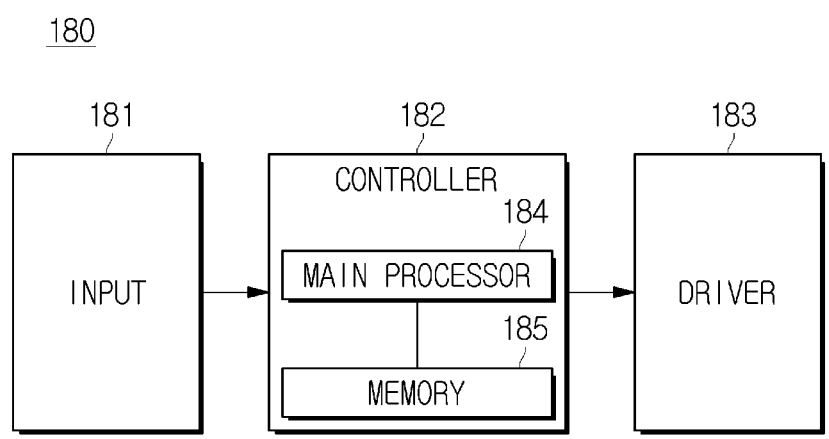
FIG. 4 is a block diagram of a vehicle control system according to an embodiment of the present disclosure.

As shown in FIG. 4, the driving assistance system 170 according to the present disclosure may include an input 181 for receiving sensor values and the like from various sensors included in the other vehicle sensors 200 in the various electronic devices 1000 included in the amount, a controller 182 for estimating the state of the vehicle and determining the total roll moment of the vehicle and the distribution between the front and rear wheels for roll angle control or steering angle control and turning stability control on the asymmetric friction road surface, and a driver 183 for controlling the attitude of the vehicle according to the control signal of the controller 182.

At this time, the controller 182 includes a main processor 184 for calculating the turning determination of the vehicle 1, the vehicle state estimation, the roll stiffness of the front and rear wheels according to the asymmetric friction road surface judgment and a memory 185 for storing various control signals and control methods.

In this case, the memory 185 may store various types of data necessary for the operation of the main processor 184, and may include a non-volatile memory such as a flash memory, a read-only memory (ROM), an erasable programmable ROM (EPROM), and an electrically erasable programmable ROM (EEPROM), as well as a volatile memory such as a static random access memory (SRAM) and a dynamic RAM (DRAM).

The non-volatile memory may semi-permanently store a control program and control data for controlling the operation of the vehicle control system 180, and the volatile memory may load the control program and control data from the non-volatile memory, temporarily store the control program and the control data, and temporarily store various control signals output by the main processor 184.

Hereinafter, the input 181 and the controller 182 and the driver 183 of the vehicle control system 180 according to an embodiment will be described in detail.

First, the input 181 receives various sensor values measured by the other vehicle sensors 200 of the vehicle. For example, steering angle information is acquired from the steering angle sensor 203, yaw rate information is acquired from the yaw-rate sensor 202, a longitudinal and a lateral acceleration value are acquired from the acceleration sensor 201, and speed information is acquired from the speed sensor. Thereafter, the controller 182 can determine whether the vehicle is in a turning state or on an asymmetric friction road based on the sensor value input through the input 181.

Figure 5:
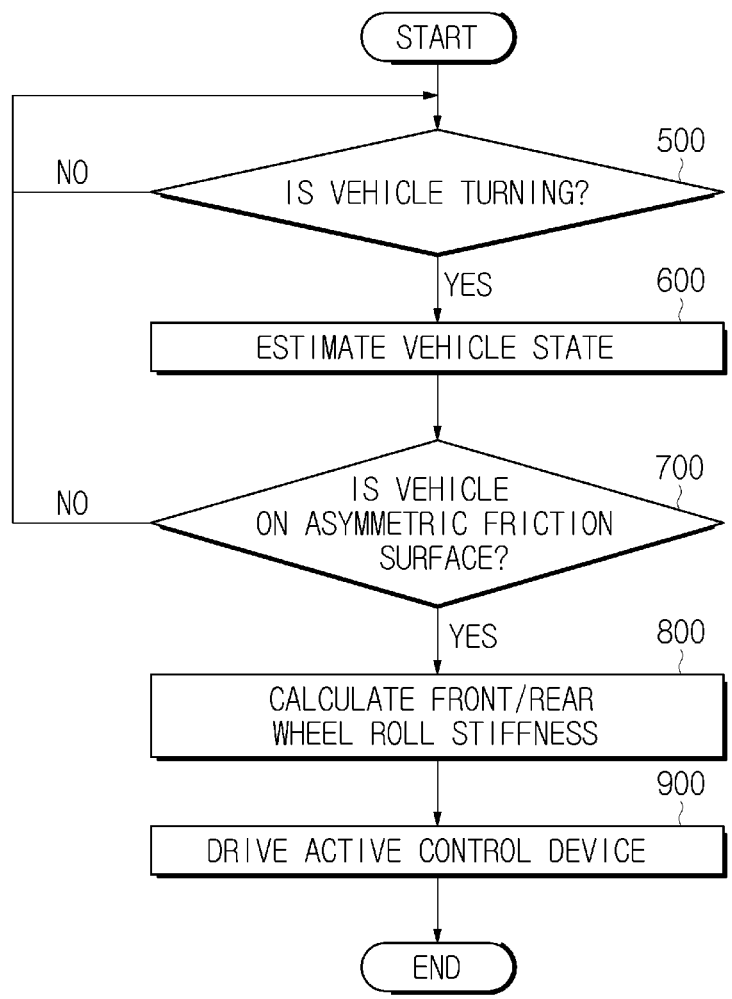
FIGS. 5 and 6 are flowcharts illustrating a control of the vehicle according to an embodiment of the present disclosure.

Particularly, the control method of the controller 182 can be briefly described through the flowchart of FIG. 5.

First, as shown in FIG. 5, the controller 182 determines whether the vehicle 1 is in a turning state 500. If it is determined that the vehicle is turning (YES in 500), the controller 182 estimates a vehicle state 600. At this time, the state of the vehicle estimated by the controller 182 includes a vehicle speed, a longitudinal slip, a driving force, a vehicle vertical force, a friction coefficient and a slip gradient calculated from the inside of the wheel.

Accordingly, from the calculated vehicle state, the controller 182 determines whether the current road surface of the vehicle 1 is on an asymmetric friction surface (700). At this time, the asymmetric friction road surface includes a case in which the left wheel and the right wheel are traveling on a friction surface having a different frictional force.

Therefore, if the controller 182 determines that the current vehicle 1 is traveling on the asymmetric friction surface (YES in 700), the controller 182 calculates the roll stiffness of the front wheel and the rear wheel, and activates the active control device 191.

In FIG. 5, a method of controlling the controller 182 of the vehicle control system 180 has been briefly described.

Figure 6:
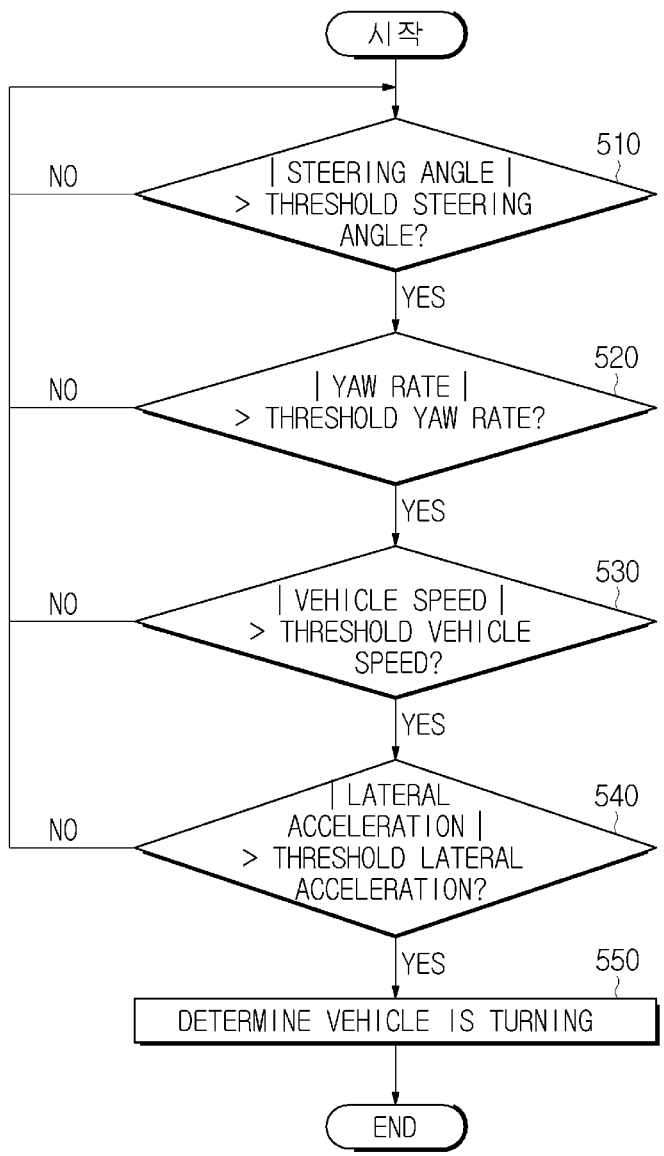

Hereinafter, a control method for each control method will be described. FIG. 6 is a flowchart for explaining the turning determination method 500 of the controller 182. The controller 182 receives the steering angle, yaw rate, vehicle speed and lateral acceleration of the vehicle from the input 181 to determine whether the vehicle is turning.

For example, if the yaw rate and lateral acceleration values are not large the controller may change the roll stiffness to cause unsteadiness of the vehicle or a sense of heterogeneity of the driver, so that the yaw rate and the lateral acceleration values are all reflected to check whether or not the turning has occurred.

Accordingly, when the absolute value of the steering angle is larger than the threshold steering angle (YES in 510), the absolute value of the yaw rate is larger than the preset threshold yaw rate (YES in 520), the vehicle speed is greater than the threshold vehicle speed, and the absolute value of the lateral acceleration is greater than the critical lateral acceleration (YES in 540), then it is determined that the vehicle is turning (550).

In FIG. 6, the controller 182 compares the threshold values in the order of the steering angle, the yaw rate, the vehicle speed, and the lateral acceleration. However, each sensor value input from the input 181 is simultaneously compared with the threshold value.

According to an embodiment, when the threshold steering angle is 10 degrees, the threshold yaw rate is 3 [deg/s], the threshold vehicle speed is 20 [kph], and the threshold lateral acceleration exceeds 0.05 g, the controller 182 can determine that the vehicle is in a turning state. However, depending on the type and weight of the vehicle 1, the respective thresholds may be set differently.

Figure 7:
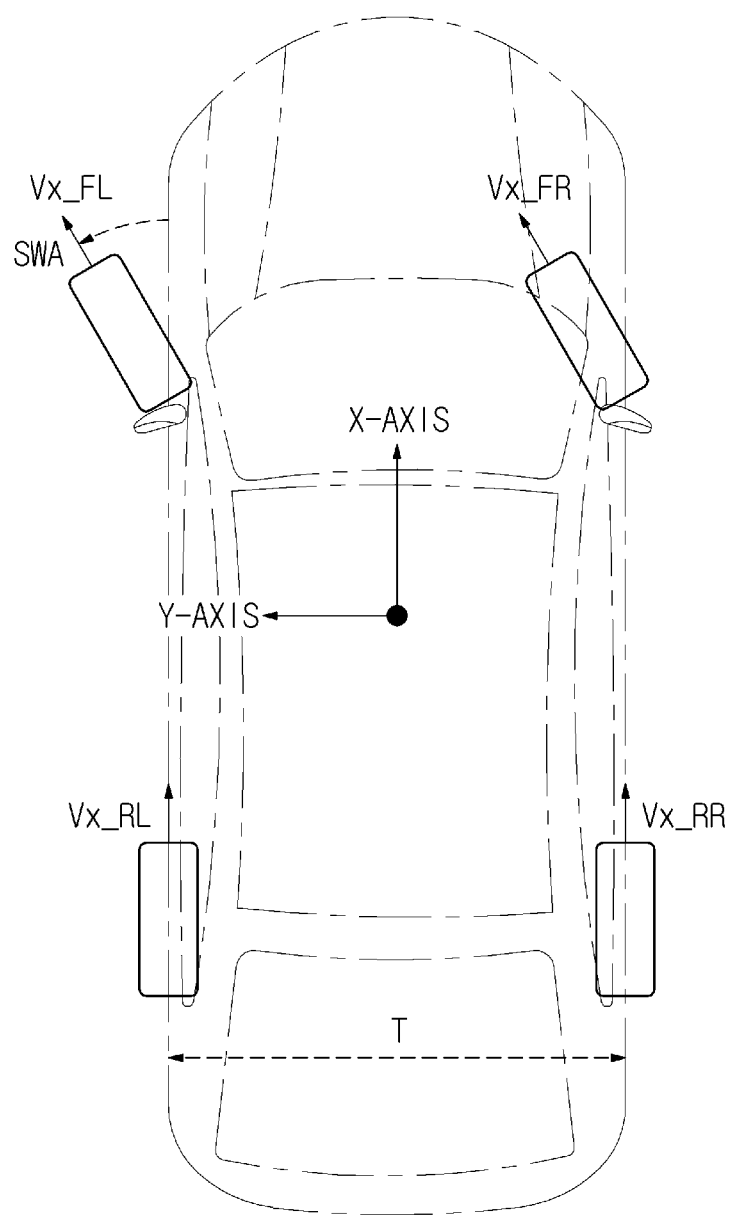
FIG. 7 is an exemplary view illustrating the wheel speed and steering angle of the vehicle.

Next, the controller 182 estimates the state of the vehicle when it is determined that the vehicle is turning. FIG. 7 is a schematic diagram showing a plurality of factors including the wheel speed and steering angle of the vehicle for determining the state of the vehicle.

Particularly, the state of the vehicle estimated by the controller 182 includes the vehicle speed, the longitudinal slip of the vehicle 1, the vertical force of each wheel and the driving force of each wheel, the longitudinal slip of each wheel, and the coefficient of friction of each wheel.

First, as shown in FIG. 7, when a running direction (longitudinal direction) of the vehicle is the X-axis and a lateral direction of the vehicle is the Y-axis, Vx_FL, Vx_FR, Vx_RL, and Vx_RR refer to the wheel speed of the left front wheel, the wheel speed of the right front wheel, the wheel speed of the left rear wheel, and the wheel speed of the right rear wheel, respectively.

Also, SWA refers to a steering angle of the vehicle wheel obtained from the steering angle sensor 203 of the vehicle 1, and T refers to a distance between two left and right tire center lines.

Therefore, the controller 182 can calculate the longitudinal vehicle speed of each wheel using the following Equation 1 to Equation 4 based on the speed of each wheel, the steering angle, the distance between the wheel center lines, and the yaw rate value.

$$Vx\_1 = Vx\_FL/\cos(SWA) + T*\text{Yawrate}/2 \qquad \text{<Equation 1>}$$

$$Vx\_2 = Vx\_FR/\cos(SWA) - T*\text{Yawrate}/2 \qquad \text{<Equation 2>}$$

$$Vx\_3 = Vx\_RL + T*\text{Yawrate}/2 \qquad \text{<Equation 3>}$$

$$Vx\_4 = Vx\_RR - T*\text{Yawrate}/2 \qquad \text{<Equation 4>}$$

In the above equations, Vx_1 indicates the longitudinal vehicle speed of the estimated left front wheel, Vx_2 indicates the longitudinal vehicle speed of the estimated right front wheel, Vx_3 indicates the longitudinal vehicle speed of the estimated left rear wheel, Vx_4 indicates the longitudinal vehicle speed of the estimated right rear wheel, and yaw rate indicates the yaw rate value of the vehicle acquired through the input 181.

Therefore, the controller 182 can calculate the final longitudinal vehicle speed value Vx_est of the vehicle as the minimum value of the estimated longitudinal vehicle speed of each wheel, as described in Equation 5.

$$Vx\_\text{est} = \min(Vx\_1, Vx\_2, Vx\_3, Vx\_4) \qquad \text{<Equation 5>}$$

Then, the controller 182 calculates the longitudinal slip value of each wheel based on the estimated final longitudinal vehicle speed value and the longitudinal vehicle speed of each wheel, as described in Equation 6 to Equation 9.

$$\text{slip\_est\_FL} = Vx\_1/Vx\_\text{est} - 1 \qquad \text{<Equation 6>}$$

$$\text{slip\_est\_FR} = Vx\_2/Vx\_\text{est} - 1 \qquad \text{<Equation 7>}$$

$$\text{slip\_est\_RL} = Vx\_3/Vx\_\text{est} - 1 \qquad \text{<Equation 8>}$$

$$\text{slip\_est\_RR} = Vx\_4/Vx\_\text{est} - 1 \qquad \text{<Equation 9>}$$

In the above equations, slip_est_FL, slip_est_FR, slip_est_RL, and slip_est_RR indicate the slip amount of the left front wheel, the slip amount of the right front wheel, the slip amount of the left rear wheel, and the slip amount of the right rear wheel, respectively.

Thereafter, the controller 182 calculates the vertical force of each wheel through Equation 10 to Equation 13, and the driving force of each wheel through Equation 14 to Equation 17.

$$Fz\_FL = w*b/(2*(a+b)) - m*ay*h/(2*T) - m*ax*h/(2*(a+b)) \qquad \text{<Equation 10>}$$

$$Fz\_FR = w*b/(2*(a+b)) + m*ay*h/(2*T) - m*ax*h/(2*(a+b)) \qquad \text{<Equation 11>}$$

$$Fz\_RL = w*a/(2*(a+b)) - m*ay*h/(2*T) + m*ax*h/(2*(a+b)) \qquad \text{<Equation 12>}$$

$$Fz\_RR = w*a/(2*(a+b)) + m*ay*h/(2*T) + m*ax*h/(2*(a+b)) \qquad \text{<Equation 13>}$$

In the above equations, Fz_FL, Fz_FR, Fz_Rl, and Fz_RR indicate the the vertical force of the left front wheel, the vertical force of the right front wheel, the vertical force of the left rear wheel, and the vertical force of the right rear wheel, respectively, and h indicates the vertical distance from the road surface to the center of gravity of the vehicle 1, and ay indicates the lateral acceleration and ax indicates the longitudinal acceleration of the vehicle of the vehicle, w indicates the vehicle weight, and m indicates the vehicle mass.

Also, the controller 182 calculates the driving force of each wheel through Equation 14 to Equation 17.

$$Fx\_FL = \text{FrontShaftTq}/2/\text{tire}\_r*\text{DiffEff}\_f*\text{DiffGear}\_f*Vx\_FR/Vx\_FL \qquad \text{<Equation 14>}$$

$$Fx\_FR = \text{FrontShaftTq}/\text{tire}\_r*\text{DiffEff}\_f*\text{DiffGear}\_f - Fx\_FL \qquad \text{<Equation 15>}$$

$$Fx\_RL = \text{RearShaftTq}/2/\text{tire}\_r*\text{DiffEff}\_r*\text{DiffGear}\_r*Vx\_RR/Vx\_RL \qquad \text{<Equation 16>}$$

$$Fx\_RR = \text{RearShaftTq}/\text{tire}\_r*\text{DiffEff}\_r*\text{DiffGear}\_r - Fx\_RL \qquad \text{<Equation 17>}$$

In the above equations, Fx_FL, Fx_FR, Fx_RL, and Fx_RR indicate the driving force of the left front wheel, the driving force of the right front wheel, the driving force of the left rear wheel, and the driving force of the right rear wheel, and FrontShaftTq indicates the front wheel shaft torque, RearShaftTq indicates the rear wheel shaft torque, Tire_r indicates the tire radius, DiffEff_f indicates the front wheel differential efficiency, DiffGear_f indicates the front differential gear ratio, DiffEff_r indicates the rear wheel differential efficiency, and DiffGear_r indicates the rear wheel differential gear ratio.

Each gear ratio, efficiency, and the like, is generally a value set at the time of vehicle design. In addition, the front wheel or the rear wheel shaft torque can be calculated by the controller 182 based on the input value provided by the input 181 in real time through various electronic devices of the vehicle.

For example, in the case of a two-wheel drive (2WD) vehicle, the shaft torque of the main drive wheels is calculated.

At this time, the shaft torque value of the main drive wheels can be calculated by multiplying the engine output torque percent by the maximum engine torque, the present gear ratio, and the longitudinally-decelerated gear ratio. Particularly, the input 181 receives the engine output torque percentage from the engine control system (EMS) via CAN communication, the maximum engine torque is input to the vehicle CAN communication, the current gear state is input to the vehicle CAN communication, and then the controller 182 calculates the shaft torque value.

Further, for example, in the case of a four-wheel drive (4WD) vehicle, the controller 182 calculates the shaft torque of the main drive wheels and the 4WD drive wheel shaft torque. Particularly, the shaft torque of the main drive wheels can be calculated by multiplying the engine output torque percent by the maximum engine torque, the present gear ratio, and the 4WD distribution ratio. In addition, the shaft torque of the 4WD drive wheel can be calculated by multiplying the engine output torque percent by the maximum engine torque, the present gear ratio, and (1-4WD distribution ratio). At this time, the input 181 receives the engine output torque percentage from the engine control system (EMS) via CAN communication, the maximum engine torque is input to the vehicle CAN communication, receives the current gear state and 4WD distribution ratio through the vehicle CAN communication, and the controller 182 can calculate the shaft torque value of the main drive wheel or the 4WD drive wheel.

Therefore, the controller 182 can calculate the shaft torque differently depending on whether the vehicle is a two-wheel drive or a four-wheel drive vehicle, based on the calculated shaft torque values, and the driving forces of the respective wheels can be calculated through Equation 14 to Equation 17 by the controller 182.

Next, the controller 182 calculates the ratio of the friction coefficient of each wheel to the longitudinal slip inclination. Particularly, Equation 18 to Equation 21 indicate the ratio of the driving force and the vertical force of each wheel to the ratio of the friction coefficient of each wheel to the longitudinal slip inclination.

$Mu\_FL=(Fx\_FUL/Fz\_FL)/Slip\_est\_FL$ <Equation 18>

$Mu\_FR=(Fx\_FR/Fz\_FR)/Slip\_est\_FR;$ <Equation 19>

$Mu\_RL=(Fx\_RL/Fz\_RL)/Slip\_est\_RL$ <Equation 20>

$Mu\_RR=(Fx\_RR/Fz\_RR)/Slip\_est\_RR$ <Equation 21>

In the above equations, Mu_FL, Mu_FR, Mu_RL, and Mu_RR indicate the left front wheel friction coefficient, the right front wheel friction coefficient, the left rear wheel friction coefficient, and the right rear wheel friction coefficient, respectively, and Slip_est_FL, Slip_est_FR, Slip_est_RL, and Slip_est_RR indicate the left front longitudinal slip inclination, the right front longitudinal slip inclination, the left rear longitudinal slip inclination, and the right rear longitudinal slip inclination. At this time, the controller 182 can calculate the longitudinal slip inclination of each wheel on the basis of the slip amount of each wheel of Equation 6 to Equation 9.

Next, the controller 182 determines whether or not the road surface on which the vehicle is currently traveling is an asymmetric friction road surface through the state of the vehicle estimated on the basis of the above-mentioned Equation 1 to Equation 21. Particularly, the controller 182 determines that the vehicle runs on the high friction road surface when the friction coefficient of each wheel estimated based on Equation 18 to Equation 21 exceeds the threshold value set for each wheel, and determines that the vehicle runs on the low friction road surface when the friction coefficient of each wheel is smaller than the threshold value set for each wheel. At this time, the threshold value set for each wheel can be set to have an independent threshold value for each wheel depending on the situation such as the center of gravity of the vehicle, the turning direction, and the like.

For example, the following Equations 22 to 25 are equations for explaining the case where the road surface of each wheel is judged to be a high friction road surface.

$SplitMu\_FL=1$ (if $Mu\_FL>threshold\_FL$) <Equation 22>

$SplitMu\_FR=1$ (if $Mu\_FR>threshold\_FR$) <Equation 23>

$SplitMu\_RL=1$ (if $Mu\_RL>threshold\_RL$) <Equation 24>

$SplitMu\_RR=1$ (if $Mu\_RR>threshold\_RR$) <Equation 25>

In the above equations, threshold_FL, threshold_RL, threshold_FR, and threshold_RR indicate threshold friction coefficients of each wheel, and if the frictional coefficient of each wheel calculated from Equation 18 to Equation 21 is larger than the threshold friction coefficient, it can be determined that each wheel is individually on a high friction road surface. However, the controller 182 additionally determines whether or not the vehicle 1 is traveling on an asymmetric friction surface on the basis of the following Equation 26.

$SplitDetect=SWA*((SplitMu\_FL*SplitMu\_RL)-(SplitMu\_FR*SplitMu\_RR))$ <Equation 26>

In this case, SplitDetect is a value for determining the asymmetric friction surface. If SplitDetect calculated from Equation 26 is larger than 0, the controller 182 determines that the vehicle 1 is traveling on an asymmetric friction surface.

In Equation 26, SWA indicates the steering angle of the wheel.

Accordingly, the controller 182 determines that the vehicle is traveling on an asymmetric road surface if the asymmetric road surface judgment coefficient (SplitDetect) calculated based on Equation 26 is larger than 0, in order to calculate the control amount of the active control device 191, the roll stiffness of the front and rear wheels is calculated. Particularly, the controller 182 updates the vehicle roll moment (Roll_moment) and the roll moment front wheel distribution ratio (ρ) when it is determined that the vehicle is running on an asymmetric road surface.

For example, Equation 27 is an equation representing a method of calculating the updated vehicle Roll_moment_new.

$$\text{Roll\_moment\_new} = \text{Roll\_moment} * \partial \qquad \text{<Equation 27>}$$

Figure 8A:
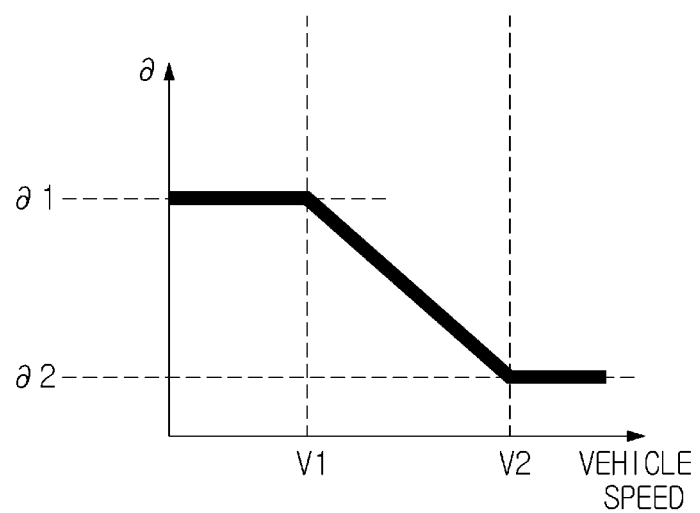
FIGS. 8A and 8B are graphs illustrating roll stiffness and roll moment based on vehicle speed according to an embodiment of the present disclosure.

It is noted that ∂ is a coefficient representing the roll moment reduction rate, and as shown in FIG. 8A, the value decreases as the vehicle speed increases. That is, for example, the magnitude of the roll moment reduction rate when the vehicle speed is V1 is ∂1, but the magnitude of the roll moment reduction rate when the vehicle speed is increased to V2 may be set to ∂2 than ∂1.

That is, as the vehicle speed increases, the instability characteristics of the vehicle increase, the controller 182 can tune the magnitude of the roll moment reduction rate to be inversely proportional to the vehicle speed, so that the total roll moment is updated to be smaller. At this time, the magnitude of the roll moment reduction rate is smaller than 1.

The controller 182 also updates the roll moment front wheel distribution ratio. However, the controller 182 can receive the roll moment front wheel distribution ratio through the input 181. In particular, since the controller 182 can stabilize the vehicle by reversing the front and rear wheel distribution ratios of the roll stiffness to the steering module due to the low friction inside the turning wheel when the vehicle is turning,
as the vehicle speed increases, the front wheel distribution ratio decreases.

Figure 8B:
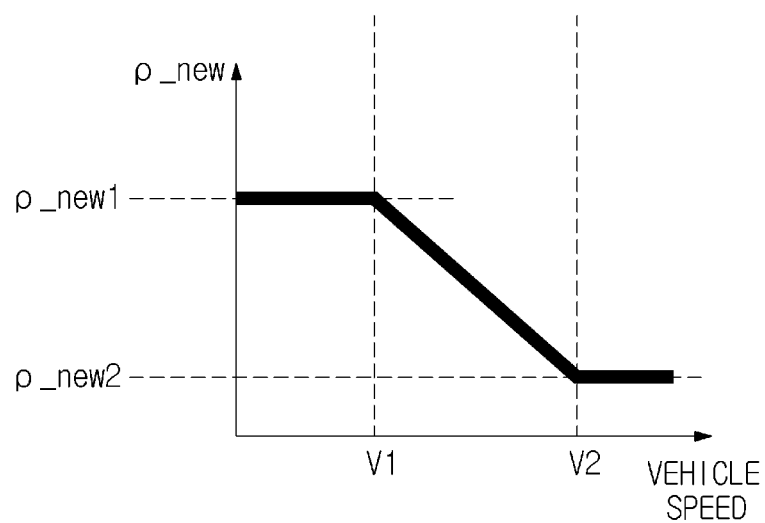

Particularly, FIG. 8B is a graph for explaining a tuning method according to the speed of the front wheel distribution ratio. That is. ρ_new is a coefficient representing the updated rolling moment front wheel distribution ratio, and as shown in FIG. 8B, the value decreases as the vehicle speed increases. For example, if the roll moment front wheel distribution ratio is ρ_new1 when the vehicle speed is V1, the roll moment front wheel distribution ratio when the vehicle speed is increased to V2 can be set to ρ_new2.

In addition, the controller 182 can update the roll moment front wheel distribution ratio as in Equation 28 when it is determined that the vehicle is running on an asymmetric road surface, and the updated roll moment front wheel distribution ratio is smaller than 0.9.

$$\rho\_new = (1-\rho)*\varepsilon \qquad \text{<Equation 28>}$$

Where ρ is the roll moment front wheel distribution ratio input through the input 181, ε is the weight of the roll moment front wheel distribution ratio and is smaller than 1, and ρ_new is the updated roll moment front wheel distribution ratio.

Therefore, the roll moment distribution ratio of the rear wheels can be calculated as shown in Equation 29.

$$\text{Roll\_moment rear wheel distribution ratio} = 1-(\rho\_new) \qquad \text{<Equation 29>}$$

Thereafter, the controller 182 calculates the roll moment based on the updated vehicle roll moment computed by Equation 27 and the updated roll moment front wheel distribution ratio calculated by Equation 28, the front wheel roll stiffness can be calculated as shown in the following Equation 30.

$$\text{Front wheel roll stiffness} = \text{Roll\_moment\_new} * \rho\_new \qquad \text{<Equation 30>}$$

Also, the controller 182 calculates the roll moment based on the updated vehicle roll moment computed by Equation 27 and the updated roll moment front wheel distribution ratio calculated by Equation 29, the rear wheel roll stiffness can be calculated as shown in the following Equation 31.

$$\text{Rear wheel roll stiffness} = \text{Roll\_moment\_new}*(1-\rho\_new) \qquad \text{<Equation 31>}$$

Therefore, the controller 182 performs the roll stiffness control of the vehicle based on the updated front wheel roll stiffness value and the rear wheel roll stiffness value calculated based on Equation 30 and Equation 31. Particularly, the driver 183 in the vehicle control system 180 can drive the active control device 191 of the vehicle with the calculated roll stiffness value.

One aspect of embodiment can stabilize the attitude of the vehicle by increasing the accuracy of the determination of the asymmetric friction road surface.

Also, as the ESC intervention time of the vehicle is slowed down during the ARS operation, it is possible to minimize the driver's sense of heterogeneity due to ESC entry.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle control system, comprising:
   a plurality of sensors configured to measure a wheel speed, a steering angle, a yaw rate, and an acceleration value; and
   a controller configured to estimate a state of a vehicle based on the wheel speed, the steering angle, the yaw rate, and the acceleration value and updating a front and rear wheel stiffness of the vehicle when it is determined that the vehicle is running on an asymmetric friction surface from the estimated state of the vehicle,
   wherein the controller is configured to determine that the vehicle is turning when the wheel speed is larger than a threshold value, and at least one of the steering angle, the yaw rate, and the acceleration value is larger than a corresponding threshold value of the steering angle, the yaw rate, or the acceleration value.

2. The vehicle control system of claim 1, wherein the controller is configured to estimate a vehicle speed from the wheel speed of each wheel, and calculate a longitudinal slip amount of each of the wheels based on the estimated vehicle speed when it is determined that the vehicle is turning.

3. The vehicle control system of claim 2, wherein the controller is configured to further calculate a driving force and a vertical force of each of the wheels, and calculates a friction coefficient of each wheel based on the driving force, the vertical force, and the longitudinal slip amount of each of the wheels.

4. The vehicle control system of claim 3, wherein the controller is configured to determine as the vehicle is on a high friction road surface when the calculated friction coefficient of each wheel is larger than the friction coefficient individually determined for each of the wheels, and determine that the vehicle is on the asymmetric frictional road based on a judgment result of the high friction road surface of a left front wheel and a left rear wheel of the vehicle and a judgment result of the high friction road surface of a right front wheel and a right rear wheel.

5. The vehicle control system of claim 4, wherein the controller is configured to update a roll moment of the vehicle and a roll moment front-rear wheel distribution ratio and calculate the front and rear wheel roll stiffness based on the updated roll moment and the roll moment front-rear wheel distribution ratio when the vehicle is judged to be on the asymmetric frictional road surface.

6. The vehicle control system of claim 5, wherein the controller is configured to reduce the roll moment and the roll moment front-rear wheel distribution ratio when updating the roll moment and the roll moment front-rear wheel distribution ratio.

7. The vehicle control system of claim 6, wherein when updating the roll moment and the roll moment front-rear wheel distribution ratio, the controller is configured to once again reduce the roll moment and the roll moment front-rear wheel distribution ratio as the vehicle speed of the vehicle increases.

8. A controlling method of a vehicle control system, comprising:
   measuring, by a plurality of vehicle sensors, a wheel speed, a steering angle, a yaw rate, and an acceleration value of a vehicle;
   estimating, by a controller, a state of the vehicle based on the measured wheel speed, the steeling angle, the yaw rate, and the acceleration value; and
   updating, by the controller, the front wheel and rear wheel roll stiffness of the vehicle when it is determined the vehicle is running on an asymmetric friction road surface from the estimated state of the vehicle,
   wherein estimating the state of the vehicle further comprises:
      determining the vehicle is turning when the measured wheel speed is lamer than a threshold value, and at least one of the measured steering angle, the yaw rate, and the acceleration value is larger than a corresponding threshold value of the steering angle, the yaw rate, or the acceleration value.

9. The controlling method of claim 8, wherein determining the vehicle is turning further comprises:
   estimating the vehicle speed from the wheel speed of each wheel, and calculating a longitudinal slip amount of each of the wheels based on the estimated vehicle speed when it is determined that the vehicle is turning.

10. The controlling method of claim 9, further comprising:
    calculating a driving force and a vertical force of each of the wheels; and
    calculating a friction coefficient of each wheel based on the driving force, the vertical force, and the longitudinal slip amount of each of the wheels.

11. The controlling method of claim 10, wherein determining the vehicle is running on the asymmetric friction road surface further comprises:
    determining as a high friction road surface when the calculated friction coefficient of each wheel is larger than the critical friction coefficient individually determined for each of the wheels, and determining as an asymmetric frictional road based on the judgment result of a high friction road surface of the left front wheel and the left rear wheel of the vehicle and a judgment result of the high friction road surface of the right front wheel and the right rear wheel.

12. The controlling method of claim 11, wherein updating the front wheel and rear wheel roll stiffness of the vehicle further comprises:
    updating a roll moment of the vehicle and the roll moment front-rear wheel distribution ratio and calculating the front and rear wheel roll stiffness based on the updated roll moment and the roll moment front-rear wheel distribution ratio when the vehicle is judged to be on the asymmetric frictional road surface.

13. The controlling method of claim 12, wherein updating the front wheel and rear wheel roll stiffness of the vehicle further comprises:
    reducing the roll moment and the roll moment front-rear wheel distribution ratio when updating the roll moment and the roll moment front-rear wheel distribution ratio.

14. The controlling method of claim 13, wherein updating the front wheel and rear wheel roll stiffness of the vehicle further comprises:
    further reducing the roll moment and the roll moment front-rear wheel distribution ratio as the vehicle speed of the vehicle increases when updating the roll moment and the roll moment front-rear wheel distribution ratio.

* * * * *